United States Patent [19]

Blomeyer, deceased et al.

[11] 4,289,813

[45] Sep. 15, 1981

[54] PROCESS FOR COATING SOLVENT-FREE LACQUERS

[75] Inventors: Freidrich Blomeyer, deceased, late of Schildgen, Fed. Rep. of Germany, by Agnes Blomeyer, heiress; Gerhard Mennicken, Opladen, Fed. Rep. of Germany; Walter Uerdingen, Leverkusen, Fed. Rep. of Germany

[73] Assignee: Bayer Aktiengesellschaft, Leverkusen, Fed. Rep. of Germany

[21] Appl. No.: 115,463

[22] Filed: Jan. 25, 1980

Related U.S. Application Data

[63] Continuation of Ser. No. 616,108, Sep. 23, 1975, abandoned, which is a continuation of Ser. No. 438,049, Jan. 30, 1974, abandoned.

[30] Foreign Application Priority Data

Feb. 1, 1973 [DE] Fed. Rep. of Germany ....... 2304893

[51] Int. Cl.$^3$ .............................................. B05D 3/02
[52] U.S. Cl. .......................... 427/385.5; 260/22 TN; 427/387; 427/388.1; 427/388.2; 427/388.5; 427/393; 427/393.5; 525/61; 525/123; 525/440
[58] Field of Search ............... 427/385.5, 388.1, 388.2, 427/388.4, 388.5, 393, 393.5, 387, 421, 428; 260/22 TN; 525/440, 123, 61

[56] References Cited

U.S. PATENT DOCUMENTS

| | | | |
|---|---|---|---|
| 2,981,712 | 4/1961 | Harper | 525/440 X |
| 3,028,367 | 4/1962 | O'Brien | 525/440 X |
| 3,098,755 | 7/1963 | Barth et al. | 428/423.9 X |
| 3,183,112 | 5/1965 | Gemassmer | 106/316 |
| 3,248,370 | 4/1966 | Reischl | 525/440 X |
| 3,437,500 | 4/1969 | Hennig et al. | 106/252 |
| 3,546,148 | 12/1970 | Diamond et al. | 260/18 |
| 3,647,848 | 3/1972 | Wagner et al. | 260/453 AB |
| 4,044,171 | 8/1977 | Muller et al. | 427/385.5 X |

FOREIGN PATENT DOCUMENTS

| | | |
|---|---|---|
| 1571136 | 7/1970 | Fed. Rep. of Germany . |
| 966338 | 8/1964 | United Kingdom ............... 525/440 |
| 1042703 | 9/1966 | United Kingdom ............... 525/440 |
| 1043673 | 9/1966 | United Kingdom . |
| 1305921 | 2/1973 | United Kingdom . |
| 1305922 | 2/1973 | United Kingdom . |

OTHER PUBLICATIONS

German Dyestuff Magazine Issue 11, pp. 471–476, "Solvent-Free Polyurethane Systems," (1962).
Chemical Abstracts–Article 2283d, vol. 64, (1966).

*Primary Examiner*—Ronald H. Smith
*Assistant Examiner*—Thurman K. Page
*Attorney, Agent, or Firm*—Gene Harsh; Lawrence S. Pope; Thomas W. Roy

[57] ABSTRACT

This invention discloses mixtures for use as binders for solvent-free lacquers which are liquid at room temperature, can be prepared in the presence of moisture and have good light stability and resistance to weather.

The mixtures contain:
- (a) at least one organic polyisocyanate which contains aliphatically bound isocyanate groups;
- (b) at least one polyhydroxyl compound with a molecular weight of 200 to 2000 which is free from ether groups; and
- (c) 0–40 percent by weight, based on the total mixture of monohydric and/or polyhydric alcohols with a molecular weight below 200;

the components of the mixture being used in such quantities that the NCO/OH ratio is between 0.8:1 and 1.2:1.

9 Claims, No Drawings

PROCESS FOR COATING SOLVENT-FREE LACQUERS

This is a continuation of application Ser. No. 616,108 filed Sept. 23, 1975, which in turn is a continuation application of Ser. No. 438,049 filed Jan. 30, 1974, now abandoned.

BACKGROUND OF THE INVENTION

This invention discloses mixtures for use as binders for solvent-free lacquers which are liquid at room temperature, can be prepared in the presence of moisture, and have good light stability and resistance to weather.

Paints which are applied by the usual methods such as spraying, brush coating, dipping, casting or application with rollers are normally mixed with solvents and diluents to adjust them to the viscosity most suitable for the given process of application. These solvents and diluents evaporate after application of the paint. The solvents must be recovered and burnt or otherwise removed because they constitute a nuisance to the worker, safety risk and an ecological problem. Attempts have therefore already been made to replace these solvents by water but watersoluble or water miscible coating compounds produced for these purposes in most cases contain alcohols or glycols and sometimes amines which give rise to problems of waste water pollution. Moreover it has not so far been possible to produce so-called dispersion paints which satisfactorily combine the desired properties of gloss, permanence and mechanical strength.

Although dispersions of organic polymers (so-called non-aqueous dispersions) in certain solvents which are less harmful from the point of view of industrial hygiene can be produced with solids contents of 60% or more, coats produced from such dispersions are still unsatisfactory in their qualities and the flash point of the solvents used is still too low.

So-called powder lacquers have therefore increasingly come into use in recent times. These are dry, pigmented lacquer powders with particles mostly measuring less than 100μ which are applied to a workpiece in an electrostatic field and then melted at an elevated temperature, the melting process being in some cases accompanied by a crosslinking reaction. This process has, however, the disadvantages of requiring the use of extruders, which are apparatus not normally used in the lacquer industry, and also that it is very difficult to produce a given color shade and the change of shade is very time consuming for the user.

Attempts were therefore made at a very early stage in the development of this process, especially in the case of so-called two-component reaction systems, to produce solvent-free low viscosity systems either by selecting suitable reaction components or by adding diluents which were reactive and could therefore be incorporated in the systems. Examples of substances used in such systems include unsaturated polyesters dissolved in monostyrene and catalyzed with peroxides, solutions of oligomeric acrylates in monoacrylic acid esters or methacrylic acid esters, solutions of polyepoxides in epichlorohydrin, etc. Combinations of relatively low viscosity aromatic diisocyanates or polyisocyanates and hydroxyl polyethers which can be diluted with reactive diluents such as phenoxyethanol are also known.

All the known processes outlined above for producing solvent-free paints have various disadvantages which may in some cases be serious. None of these systems is capable of combining all the properties required, for example, by decorative paints used on motor cars, refrigerators, furniture, machinery, etc. In some cases the capacity for taking up pigments in unsatisfactory and, in others, the surface adherence or mechanical strengths and, in most cases, the lightfastness is insufficient or the pot life or spread coating properties may be quite inadequate.

Some progress has been made with products described in German Offenlegungsschrift No. 2,006,055 which consist of combinations of polyhydroxypolyethers, monoalcohols and polyisocyanates, especially aromatic polyisocyanates, which can be applied by electrostatic spray processes. These products, however, have the serious disadvantage of being insufficiently lightfast and weather resistant for many purposes even if the preferred aromatic polyisocyanates are replaced by aliphatic polyisocyanates. A further disadvantage is that the reaction mixtures used must be prepared with the most rigorous exclusion of moisture, so that all the raw materials used must generally be subjected to a special drying operation.

It is therefore an object of this invention to provide binders for solvent-free lacquers which are liquid at room temperature in which the disadvantages mentioned above would be obviated.

According to the invention, this problem could be solved by using as binders certain mixtures of low viscosity polyisocyanates in which all the isocyanate groups are aliphatically bound, certain polyhydroxyl compounds which are free from ether groups and which may also contain certain reactive diluents.

SUMMARY OF THE INVENTION

This invention therefore relates to a process for coating substrates using solvent-free coating compositions which are liquid at room temperature and have viscosities within the range of 30 to 400 DIN seconds measured in a DIN cup 4, which coating compositions contain as a binder mixtures of
  (a) at least one organic polyisocyanate which contains aliphatically bound isocyanate groups,
  (b) at least one polyhydroxyl compound with a molecular weight of 200 to 2000 which is free from ether groups and
  (c) 0–40 percent by weight, based on the total mixture, of monohydric and/or polyhydric alcohols with a molecular weight below 200,
the components of the mixture being used in such quantities that the NCO/OH ratio is between 0.8:1 and 1.2:1.

This invention also relates to the mixtures which are used as a binder in said process.

The solvent-free lacquers prepared using the mixtures according to the invention as binders have a viscosity measured in DIN cup 4 of 20–400 DIN seconds, preferably 20–100 DIN seconds. The viscosity of the mixtures according to the invention is also within this range. When preparing clear lacquers which contain no pigment and no fillers, the viscosities of the binder and of the finished lacquer are, of course, the same and, when preparing lacquers which contain pigment and/or fillers, the viscosity of the mixture according to the invention must be of such a value within the range given that the viscosity of the finished lacquer does not exceed the upper limit of 100 or 400 DIN seconds. All these viscosities refer to freshly prepared mixtures which are to be used according to the process of the invention. The freshly prepared mixtures do practically not change their viscosity during a period of time of approximately 30 minutes.

The mixtures according to the invention are two component systems, i.e. mixtures of polyisocyanates with hydroxyl compounds in which the NCO/OH ratio is between 0.8:1 and 1.2:1 preferably 1:1. Adjustment of the mixtures to the required viscosity is achieved by suitable choice of the components used as starting materials.

The polyisocyanate component of the mixtures according to the invention comprises polyisocyanates in which all the isocyanate groups are aliphatically bound or of mixtures of such polyisocyanates. Suitable polyisocyanates are, for example, 1-methyl-2,4-diisocyanatocyclohexane, 1-methyl-2,6-diisocyanatocyclohexane, mixtures of these two isomers, diisocyanatocyclohexanes and 3,3,5-trimethyl-5-isocyanato-methyl-cyclohexylisocyanate. The isocyanate component preferably has a viscosity of not more than 4000 cP/20° C. This condition is fulfilled particularly by the hexamethylene diisocyanate derivative preferably used as isocyanate component, namely tris-(isocyanato-hexyl)-biuret, which has a particularly low viscosity if it is not contaminated with its higher homologues. This compound can be isolated from the mixture with higher homologues normally obtained in the preparation of biuret polyisocyanates from hexamethylene diisocyanate, e.g., by the process according to U.S. Pat. No. 3,124,605, for example by extraction with cyclohexane. Another hexamethylene diisocyanate derivative which is also particularly preferred because of its viscosity is the mixture of tris-isocyanatohexyl-isocyanurate and bis-(isocyanatohexyl)-uretdione which is obtained by the oligomerization of hexamethylene diisocyanate in the presence of suitable catalysts such as, in particular, tributylphosphene at a temperature for example of 50° to 60° C. The mixture obtained by this oligomerization of hexamethylene diisocyanate contains about 30 to 70 mols percent of dimeric uretdione and about 70 to 30 mols percent of trimeric isocyanurate. Mixtures of tris-(isocyanatohexyl)-biuret with the above-mentioned polyisocyanate mixture obtained by the oligomerization of hexamethylene diisocyanate are particularly suitable for the mixtures according to the invention.

The mixtures according to the invention contain the polyisocyanate component in combination with compounds within a molecular weight range of 200 to 2000, preferably 250 to 800, which contain aliphatically bound hydroxyl groups and are free from ether groups, in particular polyhydroxypolyesters. Suitable polyester polyols are, for example, the known reaction products of polyurethane chemistry obtained from polycarboxylic acids such as phthalic acid, isophthalic acid, terephthalic acid, tetrahydrophthalic acid, hexahydrophthalic acid, oxalic acid or adipic acid and excess quantities of higher valent alcohols such as ethylene glycol, propylene glycol, butanediol, hexanediol, glycerol, trimethylolpropane, hexanetriol, trimethylolethane, pentaerythritol, etc. These polyester polyols are generally comparatively high viscosity liquids or soft resins. It is particularly preferred to use polyester alcohols of phthalic acid and/or tetrahydrophthalic acid and/or hexahydrophthalic acid and trimethylolpropane and/or trimethylolethane with a hydroxyl group content of 2 to 13 percent by weight. Castor oil is also a particularly suitable polyhydroxyl compound. Alkyd resins of synthetic fatty acids, phthalic acids and trimethylolpropane with a hydroxyl content of 3.5 to 6% by weight or polyacrylates which contain hydroxyl groups may also be used. If polyhydroxypolyacrylates are used these compounds may also have molecular weights of above 2000. Polyhydroxypolyesters obtained by the polymerization of ε-caprolactone are also suitable; these are usually low viscosity products with good resistance to weathering. The compounds mentioned above may also contain other functional groups, for example amino groups, for the purpose of obtaining certain properties, for example to increase the reactivity.

To adjust the viscosity so that it is within the range mentioned above which is essential to the invention, the addition of reactive diluents is necessary, especially when using higher viscosity polyester polyols with a high hydroxyl functionality. These reactive diluents are monohydric or polyhydric aliphatic alcohols with a molecular weight of below 200. It is particularly advantageous to use products which have a boiling point above 120° C. Pentanol, hexanol, benzyl alcohol, ethyl alcohol, propylene glycol monoacetate, butyl glycollate, ethylene glycol, diethylene glycol, trimethylolpropane, hexanetriol, glycerol, etc. are examples of suitable reactive diluents. These diluents are added in proportions of 0 to 40% by weight, preferably 10 to 30% by weight, based on the total quantity of binder. The reactive diluents particularly preferred are mixtures of a monoalcohol to polyalcohol of the type mentioned above in which the proportion by weight of monoalcohol to polyalcohol is between 10:90 and 90:10, preferably between 30:70 and 70:30. If the polyhydroxyl compound used is castor oil it is particularly advisable to use dihydric or higher valent alcohols as reactive diluents. When using monoalcohols as reactive diluents it is, of course, necessary to ensure by adding trifunctional and higher functional polyester polyols or polyisocyanates that the monofunctionality of the diluents is compensated for by the polyfunctionality of the other components.

The addition of water-absorbing or dehydrating agents is generally not necessary in the preparation of lacquer mixtures. Deliberate additions of water up to the order of 3% based on the total quantity of binder do not generally result in the formation of bubbles or other defects in the film or film properties under the forced drying conditions which are conventionally employed in the industry. The lacquer mixtures according to the invention may be combined with pigments and fillers in the usual manner by means of the apparatus conventionally used in the lacquer industry.

Other lacquer raw materials and/or additives such as cellulose esters, levelling agents, plasticizers, silicone oils, resins and other materials which are conventionally used may, of course, also be added. The reactivity of the polyurethane lacquers may be adjusted by adding catalysts known per se. The viscosity of lacquers containing the mixtures according to the invention as binders may, if necessary, be reduced by the addition of small quantities of conventional lacquer solvents, preferably 0 to 15 percent by weight based on the total mixture.

Lacquers containing the mixtures according to the invention as binders may be applied to their substrates by any of the usual methods such as brush coating, spraying, dipping, etc. The lacquers are particularly suitable for coating any substrates made of metal, wood, synthetic resins or other materials.

DETAILED DESCRIPTION

The following polyesters and polyisocyanates are used in the examples:

Polyester I: Polyester of 49 parts by weight of phthalic acid anhydride, 15 parts by weight of ethylene glycol and 44 parts by weight of trimethylolpropane.

Polyester II: Polyester of 43.7 parts by weight of trimethylolpropane, 31.9 parts by weight of phthalic acid anhydride, 11.1 parts by weight of adipic acid, 23.7 parts by weight of 2-ethylhexanoic acid and 2.11 parts by weight of maleic acid.

Polyisocyanate I: A biuret polyisocyanate mixture consisting substantially of tris(isocyanatohexyl)-biuret and prepared by biuretization of hexamethylene diisocyanate which has a viscosity of 2400 cP at 20° C.

Polyisocyanate II: Isocyanurate/uretdione mixture prepared by oligomerization of hexamethylene diisocyanate in the presence of tributylphosphene, viscosity 1000 cP/20° C.

Polyisocyanate III: 4,4'-Diisocyanatodicyclohexylmethane.

EXAMPLE 1

|  | Parts by weight |
|---|---|
| Component A | |
| Polyester I | 50 |
| Polyester II | 50 |
| Butyl glycollate | 100 |
| 2-Ethylhexane-1,3-diol | 100 |
| Silicone oil (10% in xylene) | 8 |
| Lead octoate (18) (10% in xylene) | 4 |
| Titanium white (rutile) | 383 |
| Component B | |
| Polyisocyanate I | 465 |
| NCO/OH ratio approximately 1:1 | |

The lacquer is prepared by mixing 100 parts by weight of Component A with 67 parts by weight of Component B.

The viscosity of the mixture is approximately 225 seconds outflow time from a 4 mm cup (DIN 53211).

This viscosity is suitable for applying the lacquer by rollers. If the lacquer is to be applied by spraying, it can be adjusted to the required viscosity for this process by adding from 10 to 15% of ethyl glycol acetate/xylene (1:1) based on the total quantity of mixture. The pot life of this lacquer mixture is approximately 2 hours.

Properties of the lacquer film:

| Erichsen cupping DIN 53156 | 11.0 | mm |
|---|---|---|
| Pendulum hardness (Konig) DIN 53157 | 108.0 | seconds |
| Drying time of the lacquers at 130° C. | 30 | minutes |

EXAMPLE 2

|  | Parts by weight |
|---|---|
| Component A | |
| Polyester I | 50 |
| Polyester II | 50 |
| Butyl glycollate | 75 |
| Trimethylolpropane (TMP) | 25 |
| 2-Ethylhexane-1,3-diol | 100 |
| Silicone oil (10% in xylene) | 8 |
| Lead octoate (18) (10% in xylene) | 4 |
| Titanium white (rutile) | 400 |
| Component B | |
| Polyisocyanate I | 230 |
| Polyisocyanate II | 230 |
| NCO/OH ratio approximately 1:1 | |

100 parts by weight of Component A are mixed with 56 parts by weight of Component B.

The resulting viscosity of the mixture is approximately 90 seconds in a 4 mm outflow cup (DIN 53211).

This viscosity is suitable for roller application or for two-component hot spraying. When 5% by weight of ethyl glycol acetate are added to the mixture the resulting viscosity is approximately 40 seconds in a 4 mm outflow cup (DIN 53211). This viscosity is suitable for applying the lacquer material by any of the known spraying processes. The pot life of the lacquer is approximately 5 hours. Drying of the lacquer at 130° C. takes up to 30 minutes.

Properties of the lacquer film:

| Erichsen cupping DIN 53156 | 11.2 | mm |
|---|---|---|
| Pendulum hardness (Konig) DIN 53157 | 106 | seconds |

EXAMPLE 3

|  | Parts by weight |
|---|---|
| Component A | |
| Polyester I | 50 |
| Polyester II | 50 |
| Butyl glycollate | 100 |
| 2-Ethyl-hexane-1,3-diol | 100 |
| Silicone oil (10% in xylene) | 6 |
| Dibutyl tin dilaurate (1% in ethyl glycol acetate | 3 |
| Titanium white (rutile) | 300 |
| Component B | |
| 3,3,5-Trimethyl-5-isocyanato-methylcyclohexylisocyanate | 290 |
| NCO/OH ratio approximately 1:1 | |

100 parts by weight of Component A are mixed with 50 parts by weight of Component B.

The pot life of the mixture is 7–8 hours. The resulting viscosity measured in a 4 mm outflow cup (DIN 53211) is 19 seconds. The lacquer can be applied by any of the known spraying processes without any further addition of solvent. To dry the lacquer, it is stoved at 80° C. for 60 minutes. The pendulum hardness (Konig) DIN 53157 after stove drying is between 50 and 80 seconds and rises to 180–200 seconds after 3 days storage at room temperature.

EXAMPLE 4

|  | Parts by weight |
|---|---|
| Component A | |
| Polyester I | 50 |
| Polyester II | 50 |
| Butyl glycollate | 100 |
| 2-Ethylhexane-1,3-diol | 100 |
| Silicone oil (10% in xylene) | 6 |
| Dibutyl tin dilaurate (10% in ethyl glycol acetate) | 3 |
| Titanium white (rutile) | 300 |
| Component B | |
| Polyisocyanate III | 240 |

-continued

| | Parts by weight |
|---|---|
| NCO/OH ratio approximately 1:1 | |

100 parts by weight of Component A are mixed with 40 parts by weight of Component B.

The viscosity of the mixture measured in a 4 mm outflow cup (DIN 53211) is 25 seconds. The pot life of the finished lacquer is approximately 20 hours. To dry the finished lacquer it is stoved at 130° C. for 30 minutes. The pendulum hardness of the lacquer coat is approximately 190 seconds determined according to DIN 53157 (pendulum hardness according to Konig).

EXAMPLE 5

| | Parts by weight |
|---|---|
| Component A | |
| 2-Ethyl hexane-1,3-diol | 100.00 |
| Castor oil | 42.50 |
| Levelling agent based on 10% polyacrylate in ethyl glycol acetate | 8.00 |
| Levelling agent based on a fluorinated hydrocarbon in 10% ethyl glycol acetate | 4.60 |
| Dibutyl tin dilaurate 10% in ethyl glycol acetate | 0.40 |
| 1/10 sec. butyrate 10% in ethyl glycol acetate | 44.00 |
| Ethyl glycol acetate | 19.00 |
| Titanium white (rutile) | 220.00 |
| Component B | |
| Polyisocyanates I | 297.50 |
| | 736.00 |
| Solids content | approx. 90% |
| Binder | approx. 60% |
| Pigment | approx. 50% (based on binder) |
| NCO/OH | approx. 1:1 |

100 parts by weight of Component A are mixed with 68 parts by weight of Component B.

The viscosity of the mixture measured in a 4 mm outflow cup (DIN 53211) is 55 seconds. The finished lacquer has a pot life of approximately 3 hours and can be applied by any known methods of application. The pendulum hardness of the lacquer coat (according to Konig) DIN 53175 after stove drying at 130° C. for 30 minutes is approximately 150 seconds. Erichsen cupping (DIN 53156) of the lacquer coat is 11.0 mm.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention except as is set forth in the claims.

We claim:

1. In a process for coating substrates with polyurethane forming lacquers and curing the coating, the improvement wherein a lacquer binder is used which has a solvent-free viscosity of 20 to 100 DIN seconds in DIN cup 4 measured according to DIN 53211 and comprises
   (a) a polyisocyanate component consisting essentially of a polyisocyanate or polyisocyanates having only aliphatically bound isocyanate groups,
   (b) a high molecular weight polyhydroxy component consisting essentially of a polyhydroxy compound or compounds which have molecular weights between 200 and 2000 and do not contain ether groups, and
   (c) 10 to 30 percent by weight, based on the total quantity of binder, of a low molecular weight component comprising monohydric and/or polyhydric alcohols with molecular weights below 200,
   wherein said components are present in quantities corresponding to an NCO to OH ratio of between 0.8:1 to 1.2:1.

2. A process for coating substrates comprising coating said substrates with a coating composition which is liquid at room temperature and contains a binder which has a solvent-free viscosity of 20 to 100 DIN seconds in DIN cup 4 according to DIN 53211, wherein said binder consists essentially of a mixture of
   (a) a polyisocyanate component consisting essentially of a polyisocyanate or polyisocyanates having only aliphatically bound isocyanate groups,
   (b) a high molecular weight polyhydroxy component consisting essentially of a polyhydroxy compound or compounds which have molecular weights between 200 and 2000 and do not contain ether groups, and
   (c) 10 to 30 percent by weight, based on the total quantity of binder, of a low molecular weight component comprising a mixture of monohydric and polyhydric alcohols with molecular weights below 200 in a ratio of mono to polyhydric of between 3:7 and 7:3,
   wherein said components are present in quantities corresponding to an NCO to OH ratio of between 0.8:1 and 1.2:1, and curing the coating.

3. In a process for coating substrates with polyurethane forming lacquers and curing the coating, the improvement wherein a lacquer binder is used which has a solvent-free viscosity of 20 to 100 DIN seconds in DIN cup 4 measured according to DIN 53211 and which comprises
   (a) at least one organic polyisocyanate with aliphatically bound isocyanate groups,
   (b) a high molecular weight polyhydroxy component consisting essentially of a polyhydroxy compound or compounds which have molecular weights between 200 and 2000 and do not contain ether groups, and
   (c) 10 to 30 percent by weight, based on the total quantity of binder, of a low molecular weight component comprising monohydric and/or polyhydric alcohols with molecular weights below 200,
   wherein said components are present in quantities corresponding to an NCO to OH ratio of between 0.8:1 and 1.2:1.

4. Process for coating substrates using coating compositions which are liquid at room temperature and which contain a binder having a solvent-free viscosity of 20 to 100 DIN seconds in DIN cup 4 according to DIN 53211, wherein said binder comprises a mixture of
   (a) tris-(isocyanatohexyl)-biuret,
   (b) a high molecular weight polyhydroxy component consisting essentially of a polyhydroxy compound or compounds which have molecular weights between 200 and 2000 and do not contain ether groups, and
   (c) 0–40 percent by weight, based on the total mixture, of a low molecular weight component comprising monohydric and/or polyhydric alcohols with a molecular weight below 200, the components of the mixture being present in quantities corresponding to an NCO/OH ratio of between 0.8:1 and 1.2:1.

5. Process for coating substrates using coating compositions which are liquid at room temperature and which contain a binder having a solvent-free viscosity of 20 to 100 DIN seconds in DIN cup 4 according to DIN 53211, wherein said binder comprises a mixture of
(a) approximately 30 to 70 percent by weight of tris-(isocyanatohexyl)-isocyanurate and approximately 70 to 30 percent by weight of bis-(isocyanatohexyl)uretdione,
(b) a high molecular weight polyhydroxy component consisting essentially of a polyhydroxy compound or compounds which have molecular weights between 200 and 2000 and do not contain ether groups, and
(c) 0–40 percent by weight, based on the total mixture, of a low molecular weight component comprising monohydric and/or polyhydric alcohols with a molecular weight below 200, the components of the mixture being present in quantities corresponding to an NCO/OH ratio of between 0.8:1 and 1.2:1.

6. The process according to claim 3, in which component (a) has a maximum viscosity of 4000 cP at 20° C.

7. The process according to claim 3, in which component (b) consists essentially of a polyester polyol with a molecular weight of 250 to 800.

8. The process according to claim 3, in which component (c) consists essentially of a mixture of a monohydric alcohol having a molecular weight below 200 and a polyhydric alcohol having a molecular weight below 200 in which the proportion by weight of monohydric alcohol to polyhydric alcohol is between 10:90 and 90:10.

9. The process according to claim 3, in which component (c) has a boiling point above 120° C.

* * * * *